United States Patent Office 2,829,330
Patented Apr. 1, 1958

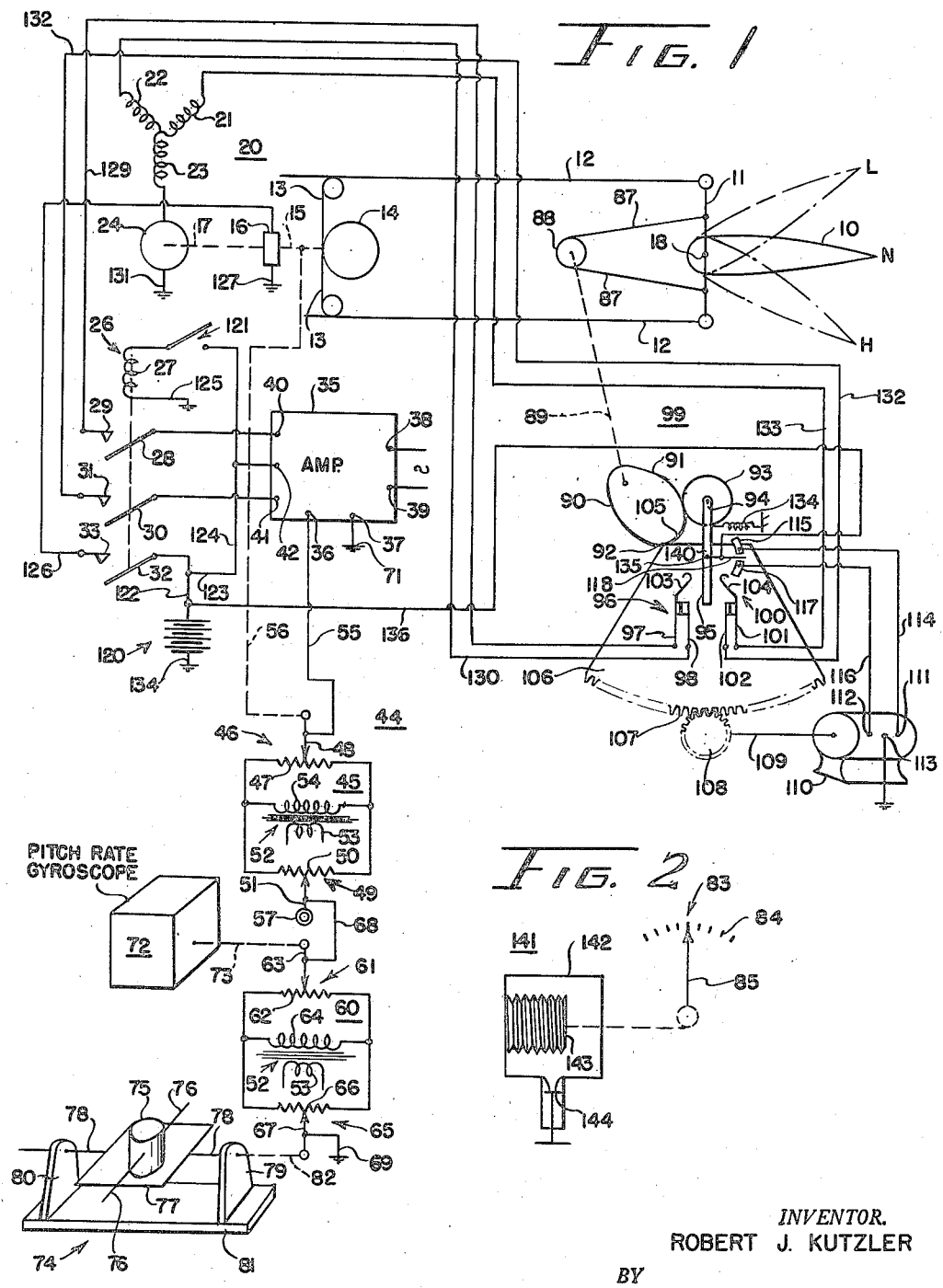

2,829,330

AUTOMATIC STEERING MECHANISM

Robert J. Kutzler, St. Louis Park, Minn., assignor to Minneapolis-Honeywell Regulator Company, Minneapolis, Minn., a corporation of Delaware Application January 23, 1952, Serial No. 267,876

10 Claims. (Cl. 318—489)

This invention pertains to automatic steering mechanisms for dirigible craft such as aircraft having control surfaces which are operated to control the attitudes of said craft about three axes. Each such control surface may be positioned manually and also by a motor. Conventionally, the circuit for such motor includes a pair of limit switches. One or the other of the limit switches is operated by a member driven from the motor, depending on the direction of motor movement, to open the motor circuit and terminate its operation thereby to limit the extent of motor operation.

It is an object of this invention to provide novel means to vary the permissible extent of movement of a motor.

It is a further object of this invention to provide novel means to vary equally the permissible extents of movement of a motor in either direction from a mean position.

It is a further object of this invention to vary equally the permissible extents of movement of a motor in either direction from a mean position which motor operates a control surface of an aircraft.

It is a further object of this invention to vary the permissible extent of movement of a motor that operates a control surface of an aircraft in accordance with a mean position of the surface necessary to maintain level attitude of the aircraft.

The above and further objects of the invention will hereinafter appear upon a consideration of the accompanying description taken in conjunction with the drawing disclosing schematically an embodiment thereof wherein:

Figure 1 is a schematic arrangement of the novel motor control system applied to an elevator channel of an automatic pilot for an aircraft, and Figure 2 represents an indicating altimeter used in association with the manual control of the automatic pilot.

Referring to the drawing, an elevator control surface 10 illustrated in side elevation conventionally may be operated manually or by a motor to change the attitude of the aircraft about its pitch axis. The elevator 10 may be supported on the axis 18 of a pivoted bar 11 for actuation therewith. Extending from the opposite ends of the bar 11 are main control cables 12, 12 which conventionally extend forward and may be operated from the control column of the aircraft during manual operation. Secondary control cables 13 are secured to main cables 12 and extend from a cable drum 14. Cable drum 14 is operated by an elevator servomotor 20 which is reversibly controlled through an elevator engage relay 26 from an elevator servomotor amplifier 35. The amplifier 35 has a balanceable control input circuit 44. The aircraft is stabilized in a selected attitude about the pitch axis primarily by a vertical gyroscope 74 which on change in pitch attitude causes unbalance in the control circuit 44. By means of a follow-up arrangement 56 extending from the shaft 15 to the circuit 44 the operation of the elevator 10 is made proportional to the unbalance of the circuit.

It has been considered desirable to provide limit switches for terminating the operation of servomotor 20 in either direction from a mean position. The termination of the motor operation has been heretofore provided in order to prevent the control surface from abutting the fixed part of the aircraft during operation. In the present instance, the extent of servomotor operation as controlled by its limit switches 96, 100 is made to vary in accordance with airspeed of the aircraft. The change in permissible servomotor movement in accordance with airspeed is done to prevent overstress of the aircraft frame.

It has been determined that the mean position of the elevator 10 to maintain the aircraft in level altitude as evident from the indicator 84 varies with airspeed. Thus, as indicated by the letters adjacent various positions of the elevator, at low airspeed the elevator has a mean position (L) which is above its normal airspeed position (N) but that at high airspeeds, its mean position (H) is below the normal streamlined position.

In order to obtain different maximum permissible movement of the elevator control surface 10 for various airspeeds, we secure from operation of the bar 11 a rotation of a cam 90. The cam 90 has a follower 93 on one end of a lever 94 whose opposite end 95 is used to open the limit switches 96, 100. The cam or eccentric 90 therefore has a mean position which corresponds with the mean position of the elevator control surface 10 for various airspeeds. The operation of the elevator 10 about this mean position causes the follower 93 to move the limit switch actuator. The cam is so contoured that at low airspeeds the follower 93 engages a slow rise portion 92 of the cam 90 so that greater rotation of the cam is necessary before the limit switch actuator 95 engages one or the other of the limit switches. On the other hand, at high airspeeds the follower engages the portion 91 of the cam 90 which has a rapid rise so that only slight rotation of the elevator 10 from its mean position is necessary before one or the other of the limit switches is opened.

In order to maintain the limit switches 96, 100 symmetrical with respect to their actuator 95, a centering motor 110 is used to position the limit switch support. The centering motor is controlled by an integration switching arrangement comprising spaced contacts 115, 117 supported in insulated relationship on base 106 and a contactor arm 118 is insulatingly supported on lever 94 at pivot point 135 of the lever, so that equal movements of the control surface about the mean position of the surface for the particular airspeed is provided.

For a better comprehension of the arrangement, a detailed description thereof follows. The cable drum 14 is carried by an output shaft 15 of servomotor 20. The shaft 15 is operably connected with a motor shaft 17 by means of a magnetic clutch 16. The servomotor 20 is of the D. C. reversible type having a pair of field windings 21, 22, a pulsing clutch winding 23, and an armature 24 for operating shaft 17. One end of windings 21, 22 are connected in common to one end of clutch winding 23, the opposite end of which is connected through motor armature 24 to ground.

Engage relay 26 comprises an operating winding 27 and relay arms 28, 30, and 32 which coact respectively within contacts 29, 31, and 33.

The amplifier 35 is of the A. C. discriminator type having A. C. signal input terminals 36, 37, A. C. power input terminals 38, 39 connected to an alternating current source, output terminals 40, 41, and a D. C. input terminal 42. The amplifier 35 causes the transfer of D. C. voltage at terminal 42 to one or the other of terminals 40, 41 by means of a pair of relays which are alternatively energized depending upon the phase relationship of the alternating signal voltage across terminals 36, 37 with respect to the alternating voltage across terminals 38, 39. The amplifier may be of the type disclosed in Patent 2,425,734 to Willis H. Gille et al.

The balanceable control signal input circuit 44 comprises a pair of signal generators 45, 60 each in the form of a Wheatstone bridge. Signal generator 45 comprises a follow-up potentiometer 46 having a resistor 47 and a slider 48; a pitch trim potentiometer 49 having a resistor 50 and a slider 51; and a transformer 52 having a primary winding 53 and a secondary winding 54. Resistors 47 and 50 are connected in parallel across the secondary winding 54. A conductor 55 extends from amplifier terminal 36 to slider 48. Slider 48 is adjusted along resistor 47 by the surface position follow-up operating means 56. Slider 51 may be selectively positioned along resistor 40 by a manually operable knob 57 affixed thereto. Signal generator 60 comprises a pitch rate potentiometer 61 having a resistor 62 and a slider 63; a pitch attitude potentiometer 65 having a resistor 66 and a slider 67; and a secondary winding 64 of transformer 52. As may be inferred, a single primary winding 53 is used to energize a plurality of secondary windings of a single transformer. A conductor 68 extends from slider 51 of the trim potentiometer 49 to slider 63 of the pitch rate potentiometer 61. A conductor 69 extends from the pitch attitude potentiometer slider 67 to ground and the circuit is completed through amplifier ground conductor 71 to amplifier terminal 37. Slider 63 is positioned along resistor 62 from a pitch rate gyroscope 72 through a suitable operating connection 73. The gyroscope is of the type well known in the art whose rotor has two degrees of angular freedom, one axis being its spin axis and the other its precession axis. Angular movement about the precession axis is opposed by suitable resilient means such as springs. As the craft changes pitch, the gyro precesses about its axis of precession an angular distance proportional to the rate of change of pitch attitude.

Slider 67 is positioned along resistor 66 from the pitch attitude gyroscope 74 by a suitable operating connection 82. The gyroscope 74 is commonly known as a vertical gyroscope and comprises a rotor mounted for rotation about a spin axis which is maintained perpendicular to the surface of the earth. This rotor is housed in a casing 75 which, in turn, is carried by trunnions 76, 76 in a gimbal ring 77 so that it has angular movement about a horizontal axis. The gimbal ring 77 is carried by cross trunnions 78, 78 in supporting bearings 79, 80 which project upwardly from a base 81. One trunnion 78 is operatively connected to the operating means 82. The gyroscope 74 is so carried on the craft that upon movement of the craft about its lateral or pitch axis the slider 67 is adjusted relative to resistor 66. The movement of the slider 67 is in accordance with the change in attitude of the craft about its pitch axis.

The normal position of the elevator control surface of an aircraft in flight in order to maintain the craft at a constant altitude varies with the speed of flight of such craft. In the drawing the elevator, as intimated, is shown in full outline in what may be considered a normal position for medium airspeeds. For low airspeeds, the normal or mean position of the elevator, in order to maintain the craft in level altitude flight, is shown in dotted outline as a slight amount of up elevator. For high airspeeds, on the other hand, the normal position of the elevator as shown in dotted outline is depressed below the medium airspeed position.

An arrangement 99 is provided which functions to vary the permissible maximum movement of the servomotor 20 in either direction from the normal or mean position of the elevator control surface for the particular airspeed concerned. The arrangement 99 provides for larger permissible rotation of the servomotor 20 for low airspeeds than for high airspeeds. The arrangement 99 comprises a pair of subcables 87, 87 each secured at one end to the elevator operating bar 11 and extending from a subcable drum 88. Thus, drum 88 is rotated whenever the main cables 12, 12 are operated. A shaft 89 having secured thereto cam 90 is driven by the drum 88. Cam 90 as stated is so contoured as to have a quick rise portion 91 and a slow rise portion 92 and a medium rise portion 105 or it may be a cam having a uniform rate of change of rise. These peripheral portions of cam 90 operate follower roller 93 carried by a double armed lever 94 having spring means 134 for biasing said lever toward said cam. The opposite arm 95 of lever 94 is the servomotor limit switch actuator. To limit rotation of the servomotor in either of two directions are the two limit switches 96, 100. The limit switches 96 and 100 are carried on a pivoted base 106. Limit switch 96 comprises a pivoted switch arm 97 and a fixed switch arm 98 resiliently biased so that their contacts engage. The pivoted arm 97 carries on its free end a portion 103 which is engaged by the arm 95 upon maximum permissable rotation of servomotor 20 in one direction. Switch 100 comprises a pivoted arm 101 and a fixed arm 102 both of which are biased so that their contacts engage one another. Pivoted arm 101 has on its free end a portion 104 engageable by arm 95 to limit the rotation of servomotor 20 in the other direction. The two armed lever 94 and the base member 106 are both carried on a pivot 135.

It will be apparent that if cam 90 be rotated counter-clockwise due to a change in the mean position of the elevator control surface 10 that the operating arm 95 would require less movement in one direction to engage portion 103 of switch arm 97 than to engage portion 104 of switch arm 101. It is desirable to maintain the actuating arm 95 midway between the portions 103, 104 to permit equal movements of the control surface 10 about its mean position for the airspeed concerned. If a uniform rate of change of rise cam is used, arm 95 will be maintained nearer one switch actuating arm than the other. The arm 95 is maintained centered with respect to the portions 103, 104 by the centering motor 110. Motor 110 rotates base portion 106 about pivot 135 at a low speed by means of a gear sector 107 on portion 106 which is meshed with the motor pinion 108 carried on drive shaft 109 of motor 110.

A low speed gear train may be placed between shaft 109 and gear 108 to make motor 110 effective to position portion 106 when contactor 118 engages one contact longer over a period of time than the other. Thus contacts 115 and 117, during transient disturbances, are engaged by arm 118 for equal periods and portion 106 does not effectively change position.

Motor 110 is of the D. C. type having a double field winding and may have one or the other of its field windings alternatively energized with the motor armature. The motor 110 comprises field terminals 111, 112 and ground terminal 113. Terminal 111 is connected by conductor 114 to a switch contact 115 carried by portion 106. Terminal 112 is connected by conductor 116 to a second switch contact 117 on base 106. The switch contacts 115, 117 are operated by an arm 118 carried on the two armed lever 94 at its pivot point 135. As arm 94 is rotated by cam 90, arm 118 engages one or the other of the switch contacts 115, 117 so that one or the other of the contacts is engaged to energize motor 110. The relationship of arm 118 to the switch contacts 115 and 117 is such that with arm 118 in the operated position, one or the other of switch contacts 115 and 117 is engaged. During the rotation of cam 90, the follower 94 is held in contact with the periphery of cam 90 by a biasing spring means 134 between arm 94 and base 106.

During normal operation of the elevator control surface 10, the contactor arm 118 engages both switch contacts 115, 117 for the same period of time so that the base portion 106 has no resultant displacement. However, when the mean position of the elevator 10 is altered, the arm 118 is maintained angularly displaced so that one switch contact 115 or 117 is maintained engaged. The motor 110 over a period of time therefore is energized only in one direction and by means of its shaft 109 displaces the base portion 106 so that the limit switches 96, 100 are centered with respect to their actuating arm 95. As the base portion 106 is slowly rotated by motor 110 to center the limit switches relative to their actuating arm, the engaged switch contact is disengaged from arm 118 to open the circuit for motor 110, thus providing for true centering of the limit switch actuator.

An altitude indicator 83, Figure 2, having a scale 84 bearing indicia coacts with a pointer 85. Pointer 85 is operatively connected to an altitude responsive device 141. Device 141 comprises a bellows 143 within a casing 142. Atmospheric pressure is admitted to the interior of casing 142 by valve 144.

The control system for elevator 10 operates as follows. The elevator may be manually operated until the aircraft has reached a desired altitude and attitude. Assuming that the aircraft is in level attitude, with the elevator 10 in streamlined position (N) the follow-up slider 48 is at the center of its resistor 47, the slider 63 of the pitch rate potentiometer 61 at the center of its resistor 62 and the slider 67 at the center of resistor 66 since the craft is in level attitude. The trim potentiometer slider 51 may be adjusted to the center of its resistor 50. The input control circuit for amplifier 35 is now in a balanced condition.

The control system may be connected to the elevator control surface 10 by operating a single pole switch 121. The operation of this switch completes a circuit from battery 120, conductor 122, conductor 123, conductor 124, switch 121, relay winding 27, conductor 125, to ground and to battery ground 134. With the engage relay 26 thus energized, the arms 28, 30, and 32 engage their respective contacts 29, 31, and 33. The engagement of relay arm 32 with contact 33 completes a circuit from conductor 122, arm 32, contact 33, conductor 126, magnetic clutch 16, conductor 127, to ground and return to battery ground 134. The energization of magnetic clutch 16 operatively connects motor drive shaft 17 with the output shaft 15. With the pulsing clutch winding 23 unenergized, the elevator surface 10 is conventionally held in braked position.

Should the craft attitude about the pitch axis be altered by a transient disturbance, the vertical gyroscope 74 displaces slider 67 relative to its resistor 66 and the pitch rate gyroscope 72 adjusts slider 63 relative to resistor 62 whereby the control circuit 44 is unbalanced. With one direction of unbalance of network 44 the amplifier relay associated with terminal 41 may be operated thereby completing a servomotor energizing circuit extending from conductor 124, amplifier D. C. input terminal 42, amplifier output terminal 41, relay arm 30, contact 31, conductor 132, limit switch arm 102, limit switch arm 101, conductor 133, servomotor field winding 21, pulsing clutch winding 23, servomotor armature 24, conductor 131, to ground and to battery ground conductor 134.

The servomotor 20 as thus energized rotates the shaft 15 which through its follow-up connection 56 operates slider 48 with respect to resistor 47 to balance network 44. Shaft 15 simultaneously rotates cable drum 14 which operates cables 13, 13 fastened to main cables 12, 12 which in turn operate the elevator 10 to apply corrective elevator. Under the corrective elevator, the craft is restored to its level position and as the craft regains its level attitude, the vertical gyroscope 74 moves the slider 67 back to its normal position. The network 44 is thereby unbalanced in the opposite direction to energize the other amplifier relay which now completes a circuit from D. C. input terminal 42, terminal 40, relay arm 28, contact 29, conductor 129, limit switch arm 97, limit switch arm 98, conductor 130, servomotor field winding 22, pulsing clutch winding 23, armature 24, conductor 131, and return to battery ground 134. The motor being reversely energized moves the control surface 10 back to normal position. Thus as the aircraft regains its original level attitude, the elevator 10 is returned to its normal streamlined position.

In normal operation of the elevator 10, the limit switch actuating arm 95 will not have been rotated a sufficient distance to engage portions 103 or 104. However, should the craft incur a large change in pitch attitude and due to a malfunction of the rebalance potentiometer 46 or if the aircraft be slow to respond to corrective elevator, the arm 95 will have been rotated to operate one or the other of the limit switches 96, 101 to prevent further rotation of the servomotor 20 and thus prevent damage by the abutting of the elevator 10 with the unoperable portions of the aircraft frame. This slow response is a situation that might occur at low airspeeds. Thus at low airspeeds the primary purpose of limiting the operation of the elevator 10 is to prevent damage of the air frame by the operation of the elevator directly.

As the airspeed of the aircraft is increased, the pilot of the aircraft while the automatic control system is connected to elevator 10 may observe on the altitude indicator 83 that the craft is no longer at the desired altitude. The pilot, in order to retrim the elevator manually, may then open the single pole engage switch 121 permitting the relay 26 to drop out and thus cause de-energization of the magnetic clutch 16. The pilot may then operate directly the cables 12 to adjust the elevator 10 so that the craft is again at the desired altitude as evident from the pointer 85 of indicator 83. The pilot may now retrim the elevator to maintain altitude and also operate the engage switch 121 to reconnect the control system with the elevator 10.

If the airspeed had increased, the mean position of the elevator 10 as it was retrimmed will now be below the normal streamlined position. With the elevator now below the mean position, the cam 90 will have been rotated clockwise so that follower 93 engages the quick rise portion 91 of cam 90. The follower 93 will have rotated the two-armed lever 94 causing actuating arm 118 to engage switch contact 115. The engagement of switch 115 by arm 118 completes a circuit for motor 110 as follows from battery 120, conductor 136, contactor arm 118, switch contact 115, conductor 114, terminal 111, motor 110, conductor 113 to ground and return to battery ground 134. The motor 110 will thereby effect rotation of base portion 106 in a counter-clockwise direction. As base portion 106 is thus rotated, switch contact 115 is disengaged from arm 118 terminating operation of motor 10. This rotation of base portion 106 since it centers contactor arm 118 relative to switch contacts 115, 117, also centers the limit switches 96, 100 relative to their actuating arm 95.

With the follower 93 engaged with the quick rise portion of cam 91, it is evident that less angular displacement of elevator 10 from its mean position in either direction will result in less angular rotation of lever 94 before the arm 95 engages with one or the other of portions 103, 104 of limit switches 96, 100 thereby preventing less rotation of the servomotor 20 for high airspeeds. By permitting less deflection of the elevator 10 at high airspeeds from its mean position, the moment which the elevator 10 when operated may exert on the aircraft is maintained within a safe value. Thus while the airspeed of the craft would tend to increase the moment exerted by a deflected elevator yet by reducing the permissible maximum displacement of the elevator as the airspeed increases the maximum moment is held within a safe value.

If the airspeed of the craft is reduced below a medium or normal value, the pilot again by observing pointer 85 relative to indicia 84 in indicator 83 while the elevator is being automatically controlled will note a change in altitude of the aircraft. The pilot again may open the engage switch 121 to disconnect the servomotor 20 from cable drum 14. The pilot retrims or repositions the elevator 10 until the indicator 83 shows that he is in level altitude again. The pilot then may re-engage the switch 121 to energize magnetic clutch 16 and reconnect the servomotor 20 with the cable drum 14. The repositioning of the elevator 10 through the subcables 87, 87 rotates the drum 88 and cam 90. Cam 90 is thus rotated in a counter-clockwise direction so that follower 93 engages a slow rise portion 92 of cam 90. With the mean position of the elevator 10 now above the normal position, the arm 118 carried by two-armed lever 94 will have engaged switch contact 117 to energize centering motor 110. The motor 110 operates to rotate base portion 106 in a clockwise direction until contact 117 is disengaged from the arm 118 to terminate operation of motor 110 and thus again the arm 118 is centered with respect to switch contacts 117 and 115 and the limit switch actuating arm 95 is centered relative to the limit switches 96 and 100. With the follower 93 engaged with a slow rise portion 92 of cam 90 a greater permissible angular movement of elevator 10 about its mean position before arm 95 engages portions 103, 104 of the limit switches is now permitted.

Preferably the elevator may be retrimmed through the automatic pilot, as airspeed changes, to maintain the desired altitude. This is attained by manually adjusting the knob 57 and slider 51. The unbalance of network 44 thus derived is offset by the repositioning of the follow-up slider 48 and the consequent retrimming of the elevator. During this adjustment, the engage relay remains energized.

Having described the operation of my system, it now will be apparent that by my invention the maximum permissible deflection of a control surface in either direction from various mean positions thereof which are assumed due to changes in airspeed in order to maintain the craft in a selected altitude, are varied in accordance with airspeed.

As many changes could be made in the above construction and widely different embodiments of this invention could be made without departing from the scope of my invention, it is intended that the above description shall be considered as illustrative and not in a limiting sense.

I claim as my invention:

1. Control apparatus for an aircraft having an elevator control surface, said apparatus comprising: a motor for positioning said surface; a balanceable control means for reversibly operating said motor in proportion to changes in pitch attitude of said craft to maintain the attitude of the craft; manual selective means for changing the balance point of said control means in either direction to cause movement of said motor to vary the normal position of said surface to maintain altitude with change in airspeed; a pair of limit switches for terminating rotation of said motor in either direction; an operating arm for said limit switches; actuating means operating with said surface for actuating said operating arm, and further means in said actuating means automatically adjusted with the change in normal position of the surface to permit greater or less operation of said surface before operation of one of said limit switches in accordance with the direction of change in the normal position of said elevator.

2. Control apparatus for an aircraft having a control surface, said apparatus comprising: means including a motor for positioning said surface; circuit means for energizing said motor including a pair of limit switches for terminating operation of said motor in either direction from a normal position; an actuator for opening one or the other of said limit switches; an operator connected to said actuator and positioned by operation of said surface; means for controlling said circuit means to alter the mean position of said surface; adjusting means for moving said limit switches relative to said arm to provide for equal operation of said motor about said altered mean position; and means in said operator automatically responsive to operation of the surface for varying the ratio of movement of said surface with respect to the operation of said actuator in accordance with the change in the means position of said surface.

3. Control apparatus for an aircraft having a control surface, said apparatus comprising: motor means for operating said surface; a balanceable control means for energizing said motor means; means in said control means to vary the mean position of said surface; limit switches in said control means for terminating operation of said motor; and motion transmitting means operably connected to said motor and having an output member for operating said limit switches to terminate motor operation; means for centering said switches relative to said motion transmitting means; and further variable ratio means in said transmitting means operated with said motor and adjusted automatically in accordance with the mean position of said surface to vary the relative extent of operation of the motor means and member whereby the operation of said motor from its mean position until a limit switch is opened varies with the mean position of said surface.

4. Control apparatus for an aircraft having a control surface, said apparatus comprising: motor means for actuating said surface; a balanceable control means for operating said motor means, said control means including an initiating controller and a follow-up controller positioned from said motor means; means for adjusting said initiating controller to displace said surface to place said craft in a selected attitude; a pair of limit switches; circuit means for energizing said motor means controlled by said control means and said limit switches; switch operating means driven by said motor means including an output member for opening said limit switches to terminate motor operation; and nonlinear transmission means in said switch operating means for adjusting the ratio of movement of said motor means to that of the output member in said switch actuating means automatically in response to the selected position of said surface a second pair of switches alternatively operated by said member in accordance with its direction of operation; and a centering motor controlled by said second pair of switches and effective to reposition both pairs of switches relative to said output member at a low rate to terminate operation of the centering motor, to provide equidistant operation of the motor means for either direction of operation of the output member to alter craft attitude from the selected value.

5. Apparatus for controlling the pitch attitude of an aircraft said aircraft having an elevator control surface, said apparatus comprising: motor means connectable with said surface for positioning said surface; means for energizing said motor means including a pair of limit switches; a two-armed lever having one arm between said limit switches for operating the same; a cam follower on said other arm; nonlinear transmission means comprising a cam having a slow rise portion and a fast rise portion for operating said lever; means for positioning said cam automatically in response to the positioning of said surface; manual means for changing the normal position of said surface and thereby the portion of said cam engaged by said follower while the motor means is disconnected from the surface; means for maintaining the limit switch actuator centered relative to opposed limit switches; whereby said control surface is adapted to have different permissible maximum angular movement in accordance with the normal position of said surface.

6. Control apparatus for an aircraft having an elevator control surface, said apparatus comprising: motor operated means for positioning said surface; a balanceable control means for initiating operation of said motor operated means; a limit switch for terminating operation of said motor operated means in one direction; an actuator for said limit switch; nonlinear motion transmission adjusting means operably connected between said motor operated means and said limit switch actuator including means responsive to the motor operated means for varying automatically the rate of movement of said switch actuator with respect to the operation of said motor for various positions of said surface; means for maintaining a predetermined distance between said limit switch and said switch actuator while said surface is unoperated; and means for controlling said control means for placing said surface in various selected unoperated positions.

7. Control apparatus for an aircraft having a control surface, said apparatus comprising: motor means for positioning said surface; circuit means for energizing said motor means; control means responsive to changes in pitch attitude for operating said circuit means to maintain said craft in a desired attitude; further means for operating said control means to vary the mean position of said surface; limit switches in said circuit means effective on operation to terminate operation of the motor means; an actuator means driven from said motor means and having an output member engageable with said limit switches; further means for maintaining a predetermined spatial relationship between the output member of the switch actuating means and the limit switches; and adjustable means in the actuator means responsive automatically to operation of the motor means for changing the rate of movement of the switch actuator output member relative to the surface operating means rate to vary the permissible extent of motor operation for various control surface mean positions.

8. Control apparatus for an aircraft having an elevator control surface, said apparatus comprising: motor means adapted to be operatively connected with said control surface; circuit means for energizing said motor means including a controller and a pair of limit switches alternatively operable and effective to terminate operation of the motor means; a balanceable circuit means for operating said controller on unbalance thereof; means responsive to change in pitch attitude and connected to said balanceable circuit means for maintaining the attitude of said craft; adjustable means in said balanceable means to vary the mean position of said surface during changes in airspeed to maintain the original altitude of said craft; an actuator means having an output member for alternatively operating said limit switches; driving connection between said motor means and said actuator means; centering means controlled by the member and slowly operating for maintaining a selected spatial relationship between said actuator output member and said limit switches; and means in said driving mean automatically responsive to the adjustable means for adjusting the rate of movement of said output member relative to the rate of movement of said surface.

9. In condition control apparatus having a condition changing device and power means operating said device, in combination: control means including a balanceable network reversibly operating said power means; switch means in said control means; switch operating means operable by said power means to terminate operation of said power means despite unbalance of said network; operable means in said network to effect unbalance thereof; follow up means positioned by said power means to rebalance said network, to alter the normal position of said device; further means for repositioning said switch means to maintain a normal position thereof relative to said switch operating means; and motion transmission means included in said switch operating means having a plurality of linear portions, each portion providing a different ratio of power means displacement to switch operating means displacement and automatically positioned by said power means during change in the normal position of said device, to variously limit subsequent operation of the power means for various changes in the normal position of the device.

10. In control apparatus for an aircraft having an attitude control device and motor means operating said device, said apparatus comprising: a balanceable control means initiating operation of said motor means; a limit switch for terminating operation of said motor means in one direction; an actuator for said limit switch; nonlinear motion transmission adjusting means operably connected between said motor means and said limit switch actuator including means responsive automatically to the operation of the motor means for varying automatically the rate of movement of said switch actuator with respect to the operation of said motor means for various positions of said attitude control device; means for maintaining a predetermined distance between said limit switch and said switch actuator while said attitude device is unoperated; and means for controlling said control means for placing said attitude control device in various selected unoperated positions.

References Cited in the file of this patent

UNITED STATES PATENTS

| | | |
|---|---|---|
| 2,221,311 | Hodgman | Nov. 12, 1940 |
| 2,476,844 | Davis et al. | July 19, 1949 |
| 2,492,745 | Hammes | Dec. 27, 1949 |
| 2,568,719 | Curry | Sept. 25, 1951 |
| 2,654,061 | Gille | Sept. 29, 1953 |